(12) United States Patent
Stoutemyer

(10) Patent No.: US 6,829,626 B2
(45) Date of Patent: *Dec. 7, 2004

(54) COMPUTER ALGEBRA SYSTEM AND METHOD

(75) Inventor: David R. Stoutemyer, Kaneohe, HI (US)

(73) Assignee: Texas Instruments Incorporated, Dallas, TX (US)

( * ) Notice: Subject to any disclaimer, the term of this patent is extended or adjusted under 35 U.S.C. 154(b) by 692 days.

This patent is subject to a terminal disclaimer.

(21) Appl. No.: 09/902,990

(22) Filed: Jul. 11, 2001

(65) Prior Publication Data

US 2002/0007385 A1 Jan. 17, 2002

Related U.S. Application Data

(60) Provisional application No. 60/217,275, filed on Jul. 11, 2000.

(51) Int. Cl.$^7$ ............................................. G06F 3/00
(52) U.S. Cl. ........................................ 708/161; 708/200
(58) Field of Search .............................. 708/160, 161, 708/162, 164, 200

(56) References Cited

U.S. PATENT DOCUMENTS

| | | | | |
|---|---|---|---|---|
| 4,845,652 A | * | 7/1989 | Bunsen | 708/144 |
| 5,189,633 A | * | 2/1993 | Bonadio | 708/142 |
| 5,526,475 A | * | 6/1996 | Razdow | 715/538 |

* cited by examiner

*Primary Examiner*—Chuong Dinh Ngo
(74) *Attorney, Agent, or Firm*—Carlton H. Hoel; W. James Brady; Frederick J. Telecky, Jr.

(57) ABSTRACT

A computer algebra system including algebraic expression transformations with a display of domain of definition constraints only when a domain of definition differs from that of an antecedent expression.

4 Claims, 4 Drawing Sheets

COMPUTER ALGEBRA SYSTEM AND METHOD

CROSS-REFERENCE TO RELATED APPLICATIONS

This patent application claims priority from provisional patent application Ser. No. 60/217,275, filed Jul. 11, 2000.

BACKGROUND OF THE INVENTION

The invention relates to electronic devices, and, more particularly, to computer algebra systems and methods.

Computer algebra systems, which can be found on advanced calculators, personal computers, and other such systems, perform various tasks such as simplifying algebraic expressions, differentiating and integrating simple functions, solving simple differential equations, and so forth. That is, algebraic expressions such as $(x+1)^2-(x-1)^2$ typically will be automatically simplified to 4x and these two expressions are equivalent for all values of the variable x. However, many computer algebra systems will automatically simplify algebraic expressions to nonequivalent expressions without warning; for example, $\ln(xy)-\ln(x)$ could be simplified to $\ln(y)$. But for negative x and y this simplification yields incorrect results: for $x=-1=y$, $\ln(xy)-\ln(x)=\ln(1)-\ln(-1)=-\iota\pi$, whereas $\ln(y)=\ln(-1)=\iota\pi$.

Various known computer algebra systems attempt to avoid simplifications which yield nonequivalent expressions. Indeed, the computer algebra system could simplify an expression only when the variables are constrained (as by the user) to insure the transformed expression will be equivalent. For example, a constraint that at least one of the variables x and y is positive is sufficient for $\ln(xy)-\ln(x)$ to be simplified to $\ln(y)$. But this requires the user to anticipate the problem.

Other computer algebra systems approach the nonequivalent expression difficulty by querying the user for constraints which will insure equivalency. But such as system may force the user to repeatedly submit input with all possible combinations of replies to obtain a complete solution, and many combinations might lead to the same result, which is frustrating for the user. Moreover, such queries can arise for internally generated variables for which the user has no knowledge. For example, a differential equation solver that tries many methods including the Laplace transform method might ask the user about the sign of s (the transform variable) when there is no such variable in the user's input. Such queries can be totally baffling to users. Finally, interactive queries are totally inappropriate for batch computation and for such lengthy interactive computations that the user wants to leave the machine running and then return to see the final result after a lengthy period of time.

An alternative approach computes a domain of definition for each algebraic expression (together with any user-supplied constraints on the variables' domains) and outputs a domain of definition together with a simplified expression. For example, the input expression "$\sqrt{x}-\sqrt{x}$ such that $x>-3$" where $x>-3$ is a user supplied constraint of the variable x, would result in an output "0 such that $x\geq 0$". Note that the constraints $x\geq 0$ (from the domain of definition of $\sqrt{}$) and $x>-3$ were combined. See the method of Dolzmann et al, Guarded Expressions in Practice, Proc. 1997 Intl. Symp. Symbolic and Algebraic Computation, pp. 376–382 (ACM NY, N.Y.; ISBN 0-89791-875-4), which provides an output of possibly several conventional expressions guarded by quantifier-free formulas. However, this involves unnecessary computation and often results in a cluttered display of results.

SUMMARY OF THE INVENTION

The present invention provides computer algebra systems with domain preservation constraints displayed with a transformed expression which has an apparent domain of definition differing from the domain of definition of the original expression.

This has advantages including elimination of extraneous displays of constraints and/or extraneous domain of definition computations.

BRIEF DESCRIPTION OF THE DRAWINGS

The drawings are simplified for clarity.

DESCRIPTION OF THE PREFERRED EMBODIMENTS

1. Overview

Figure 1:
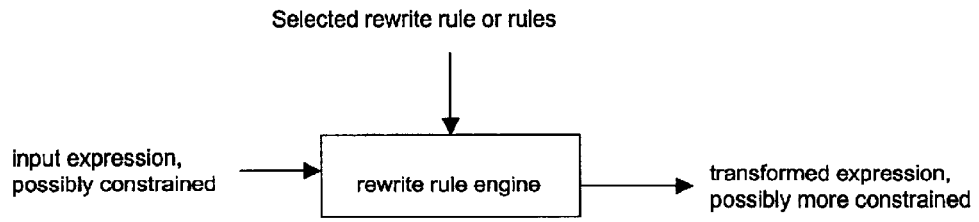
FIG. 1 is a flow diagram.

Preferred embodiment computer algebra systems and devices display domain preservation constraints to limit apparent domain of definition expansion of a transformed (simplified) algebraic expression as compared to the domain of definition of the original expression. For example, the original expression "$x^2/x$" is ill-defined at x=0 and thus has a domain of definition of $x\neq 0$; but "$x^2/x$" simplifies to the expression "x" that has an apparent domain of definition which includes x=0. Thus preferred embodiments transform "$x^2/x$" into "$x|x\neq 0$" to indicate the constraint "$x\neq 0$" still applies and constrains the apparent domain of definition of the expression "x". In contrast, the preferred embodiments simplify the expression "$x/x^2$" to "$1/x$" without any indication of domain of definition because both the original and simplified expressions have the same domain of definition, namely $x\neq 0$.

2. First Preferred Embodiments

Preliminarily consider the following definitions and manipulations which will be used to help describe the preferred embodiment computer algebra systems.

Domains. Variables in an algebraic expression may be restricted to a subset of all possible numeric values, and thus each variable (or the variables jointly) has an associated "variable domain". For example, an expression with $e^{rt}$ could require $r\geq 0$ because the exponential models positive interest rate growth. Scalar algebraic expressions are often finite and real only for the variable in a strict subset of their possible values. For example, $1/x$ is finite only for $x\neq 0$; and $\sqrt{x}$ is real only for $x\geq 0$. For most of mathematics through calculus, the "arithmetic domain" is finite real values. An expression is defined only if it and all of its sub-expressions are in the arithmetic domain. In other areas of mathematics, the arithmetic domain is finite complex values (which include real values). Moreover, values such as $+\infty$, $-\infty$, and perhaps also $\iota\infty$ are sometimes considered defined. The undeniably multi-valued $\pm\infty$ is less frequently considered defined, and the indeterminate value 0/0 is almost never considered defined. (However, one can define 0/0 as representing the entire extended real line or complex plane, or else one undetermined point therein, depending on the arithmetic domain.) In the more restrictive direction, the arithmetic domain can be restricted to rational values, integer values, or complex values having such real and imaginary parts.

The set of values of its variables in the arithmetic domain that make an expression and all of its sub-expressions defined is called the "domain of definition" of the expression. Whatever the arithmetic domain, there are corresponding recursive rules for determining a Boolean expression that represents the domain of definition (dod) of an algebraic expression. For example, with the arithmetic domain being the finite real numbers, for all algebraic expressions u and v:

dod(finite real number)→true dod(variable)→true dod(−u)→dod(u)

dod(u+v)→dod(u) AND dod(v)

dod(u−v)→dod(u) AND dod(v)

dod(u*v)→dod(u) AND dod(v)

dod(u/v)→dod(u) AND dod(v) AND v≠0 dod(ln(u))→dod(u) AND u>0 dod(arcsin(u))→dod(u) AND −1≤u≤1 dod($u^v$)→dod(u) AND dod(v) AND (u>0 OR u≤0 AND v>0 OR has OddDenominator(v) AND (u≠0 OR v>0))

The only complicated rule above is the general power $u^v$. However, that rule simplifies greatly in the two most common cases where u is positive or v is a positive number having an odd reduced denominator, which includes all positive integers:

dod($positive^v$)→dod(v)

dod ($u^{positiveWithOddDenominator}$)→dod(u)

Note that to force single-valued expressions, use one particular branch of multiply-branched expressions: Use the real branch of fractional powers having an odd reduced denominator (such as $(-1)^{1/3}$→−1); but otherwise use the principal branch. Note also that square roots, cube roots, etc. are covered by the rules for fractional powers.

If dod(expression) simplifies to true, it means that the expression is defined for all values of its variables in the arithmetic domain. Whereas, if dod(expression) simplifies to false, it means that the expression is undefined for all values of its variables in the arithmetic domain.

A computer algebra system could compute dod of each input algebraic expression; AND the dod with any domain constraints provided by the user; simplify the algebraic expression and the associated domain Boolean expression; and, lastly, display the resulting Boolean expression along with the simplified transformed algebraic expression. For example, an input expression "√x−√x|x>−3", where "|" means "such that" and x>−3 is a user supplied constraint of the variable x, would cause the output "0|x≧0". Similarly, the input expression "√x+√x" would cause the output "2√x|x≧0". However, in this latter case there is no need for the constraint "|x≧0" in the result because dod(√x+√x)=dod (2√x).

Thus the first preferred embodiment computer algebra systems apply rewrite rules to transform (simplify) algebraic expressions, with the rewrite rules indicating any expansion of the dod of a transformed expression from that of its antecedent expression. Thereby the first preferred embodiments propagate a constraint that makes the dod of the two algebraic expressions identical in order to preserve equivalence. For example, an original expression "√x−√x" being transformed to the expression "0" without any explicit dod would suggest that the dod has expanded from x≧0 to all x.

Thus the first preferred embodiments would display the simplified transformed expression as "0|x≧0". In contrast, the first preferred embodiments would transform the expression "√x+√x" to the expression "2√x" without any dod display because the dod has not changed. In particular, the transformation of "√x−√x" includes the two rewrites: a*u−b*u→(a−b)*u and 0*u→0|dod(u) with a and b equal to 1, u equal to √x, and dod(√x) equal to x≧0; whereas, the transformation of "√x+√x" to "2√x" includes the rewrite: a*u+b*u→(a+b)*u with a and b equal to 1 and u equal to √x.

Moreover, to reduce Boolean computation and screen clutter, it is desirable to compute, display, and propagate for each transformation the simplest practical constraint that preserves the dod of the input algebraic expression, that is, the "domain preservation constraint". Indeed, an original expression "√x−√(2−x)+√(2−x) has a dod of 2≧x≧0 and simplifies to √x which has a dod of x≧0. Thus the first preferred embodiments could transform to the expression "√x|2≧x≧0" or to the simpler "√x|2≧x" and in either case preserve the dod.

For example, the following two transformations make non-numeric sub-expressions disappear from a result. Therefore, the preferred embodiments compute the domain of definition of such sub-expressions to preserve equivalence between an input and its result:

0*u→0|dod(u)

$1^u$→1|dod(u)

Of course, dod(u) often simplifies to true, in which case the display can omit "| true". For example, 0*5 would simplify to 0; and $1^5$ would simplify to 1.

Other transformations introduce constraints that do not require dod computations of any sub-expressions because these sub-expressions are still present in the simplified result. For example:

$(\sqrt{u})^2$→u|u≧0

√(uv)→√abs(u)*√abs(v)|uv≧0

$e^{ln(u)}$→u|u>0 sin(arcsin(u))→u|−1≧u≧1 arcsin(sin(u))→u|−π/2≧u≧π/2

Other transformations require dod computations of some sub-expressions ANDed with additional constraints. For example:

$u^0$→1|dod(u) AND u≠0

$0^u$→0|dod(u) AND u>0

The vast majority of transformations used in computer algebra do not require computing a domain preserving constraint. Moreover, when a domain preservation constraint must be computed, it usually entails only a sub-expression of the entire expression, which is typically much more efficient than computing the dod of the entire expression. In comparison with always computing and displaying the dod of every entire input expression, preferred embodiment domain preservation constraints save time, memory, and display space. However, a dod function must be implemented to support domain preservation constraints. Therefore, the user is always free to apply that dod function to an entire expression if desired. For example, the dod of the expression √($x^2$+bx+c)+ln(sin(x)+y+$e^x$)+0/x is $x^2$+bx+

$c \geqq 0$ and $\sin(x)+y+e^x>0$ and $x \neq 0$, whereas the domain preservation constraint associated with simplifying the input expression to the sum of its first two terms is merely "$|x \neq 0$".

Domain preservation constraints can exploit constraints provided with the input. For example, the input $0*\ln(\sin(x)+y+e^x)$ would simplify to $0|\sin(x)+y+e^x>0$, whereas the input $0*\ln(\sin(x)+y+e^x)|y \geqq 1$ would simplify to $0|y \geqq 1$.

3. Implementation

Various preferred embodiment systems aim to provide users with fine control over computer algebra transformations in a way that is WYSIWYG (What You See Is What You Get) with respect to standard math instruction and textbook notation. However, this conflicts with efficiently and automatically computing a well-simplified final result in one step: internal form may eliminate many operators and functions that can be expressed in terms of more fundamental ones. For example, division is replaced by multiplication with negative powers, negation is replaced by multiplication by −1, subtraction is replaced by addition together with a negative coefficient, square roots are replaced by fractional powers, cosines and tangents are replaced by sines, and hyperbolic functions are replaced by exponentials. This reduces the number of cases that the code must test and aids automatic collection and cancellations of similar sub-expressions. A separate final pass replaces ½ powers by square roots, collects negative powers into denominators, replaces negative coefficients with subtraction or negation etc. to make the result closer to common textbook notation.

This automatic replacement of many operators and functions contends with making the transformations WYSIWYG. For example, preferred embodiments may offer users the choice of whether to transform negative exponents to division or vice-versa. As another example, users cannot have fine control over transformations involving subtraction and negation if they are always eliminated during simplification and then restored just before display.

For this reason, some preferred embodiments have simplifiers that work directly on the "external" tokenized form produced by the parser and required by the 1D and 2D displayers.

One way to provide fine control is by testing flags at many points in the code. For example, in the function that simplifies the product of two expressions we could test a flag that controlled whether or not 1*anything→anything, and similarly for anything*1, etc. Such flags may control the effects of arithmetic mode, real versus complex mode, trigonometric collection, etc. However, this hard-wired code approach leads to complicated code and difficult data changes. Therefore, some preferred embodiments employ rewrite rules which are much easier for novice implementers to understand and modify, and the resulting code density is probably higher.

A rewrite rule contains a pattern expression. A pattern matcher determines if that pattern expression matches the specific expression that we are attempting to transform. For example, using capital letters to denote pattern variables that can match any syntactically-complete portion of a specific expression, one of the patterns for simplifying ratios might be (A/B)/C. As a specific example, this pattern would match the specific expression $2*x/(x+y)/z$, with A matching $2*x$, B matching $x+y$, and C matching $z$.

A rewrite rule also contains a replacement pattern expressed in terms of the pattern variables. For the above example, an appropriate replacement pattern would be A/(B*C). If the pattern matches the specific expression, the latter is rewritten by substituting the specific match values of the pattern variables into the replacement pattern. For our example this returns $2*x/((x+y)*z)$.

We can summarize the above rewrite rule by the notation $(A/B)/C \rightarrow A/(B*C)$.

Some rules generate domain preservation constraints, which we attach to a result using the "|" operator. For example, one rule is $A/(B/C) \rightarrow A*C/B | C \neq 0$. Such constraints were discussed in the foregoing.

A rewrite rule also generally contains a predicate to test any additional conditions that must be satisfied by a match for the rewrite to occur. For example, to do multinomial expansion we can use the rewrite rule $$(A \pm B)^N \rightarrow (A \pm B)^{N-1} * (A \pm B) \text{ provided } N>1 \text{ and } N \text{ is integer.}$$

In general, we can have a sequence of one or more rules, and we can test successive rules until a rewrite occurs or none of the rules apply. For example, polynomial expansion entails not only multinomial expansion, but also distribution of products over sums.

If a rewrite does occur, we then have the choice of returning that result to the user or repeatedly applying the sequence of rules to the successively rewritten specific expression until none apply. For example, one application of the above multinomial expansion rule to the specific expression $(x+y)^3$ produces $(x+y)^{3-1}*(x+y)$, then arithmetic rules followed by distribution of products over sums produces $(x+y)^2*x+(x+y)^2*y$.

Another choice is to attempt matching only the entire highlighted portion of the specific expression, versus also attempting to match any sub-expressions. For example, two opportunities for further multinomial expansion occur in the above result $(x+y)^2*x+(x+y)^2*y$, but not at the top level.

If we choose to attempt matches at all levels, there is a choice of proceeding top-down by attempting to match successively smaller sub-expressions, versus bottom-up by attempting to match successively larger sub-expressions. Limited experiments suggests that bottom up is significantly faster—probably because rules then work on fully re-written sub-expressions.

Using, for example, a context-dependent menu of rules, the user indicates which rule or set of rules that (s)he wants to apply to a selected expression or sub-expression. The rule engine searches those rules one after the other until one is applicable, then rewrites the expression according to the rule; see FIG. 1. This rewrite might entail "anding" any associated domain preservation constraints onto any prior constraints. Moreover, these domain preservation constraints might entail computing the domain of definition of certain sub-expressions. For example, the input expression $0^{\ln(x)}|x \neq 5$ might transform to $0|x>1$ and $x \neq 5$.

Depending on the context and/or user choice, the process might be repeated until no re-write rules are applicable. Also depending on the context and/or user choice, the process might attempt to match any sub-expression or only the entire expression.

4. Systems

The preferred embodiment devices include handheld computer systems such as calculators with relatively small displays and computing power and also personal computers and various network-connected devices, all programmed with preferred embodiment computer algebra systems. The program may be (partially) stored in nonvolatile memory such as ROM, Flash EEPROM, FeRAM, and so forth, and may be loaded into a calculator via a cable link from a personal computer.

Figure 2A:
FIGS. 2a-2f are screen shots.
Figure 2B:
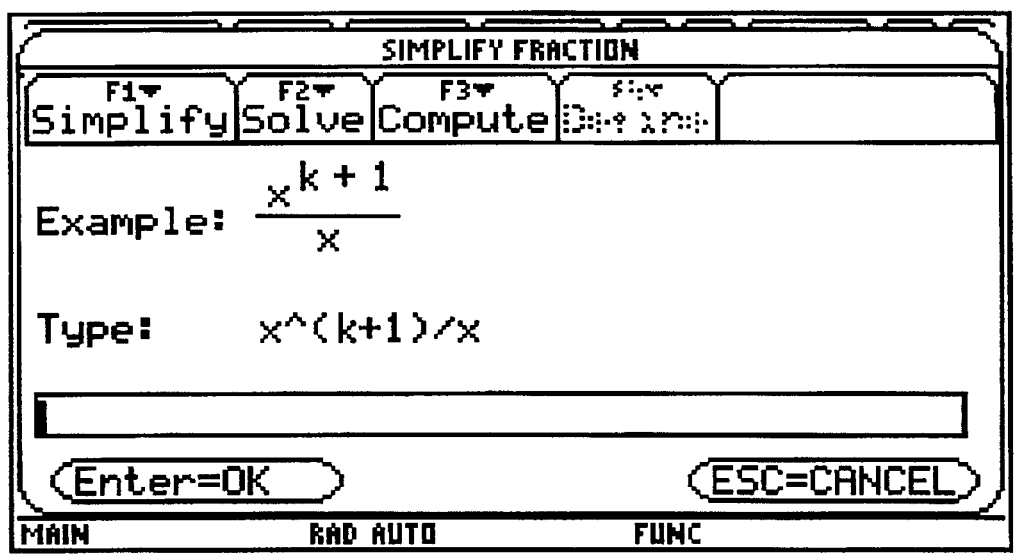
Figure 2C:
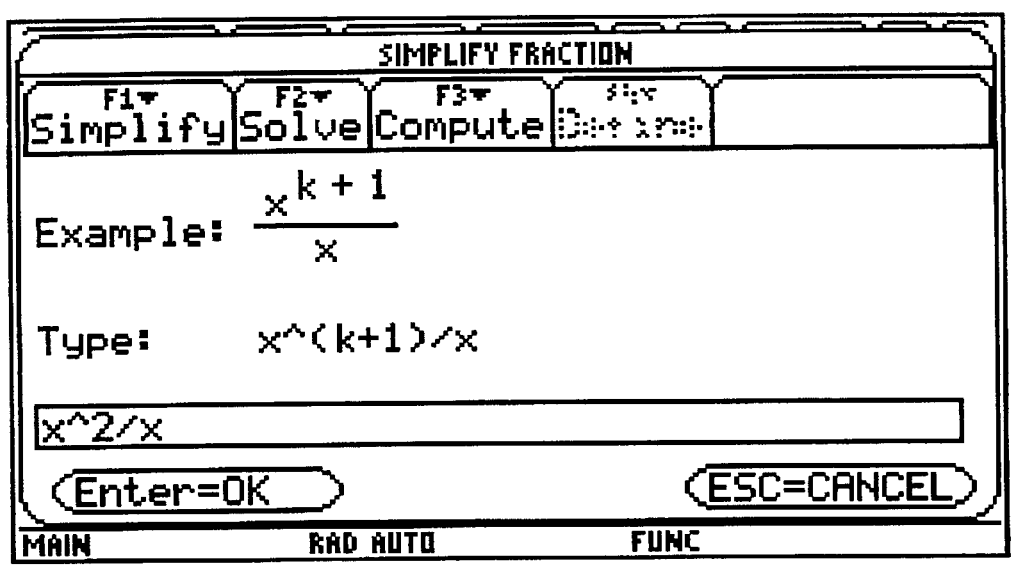
Figure 2D:
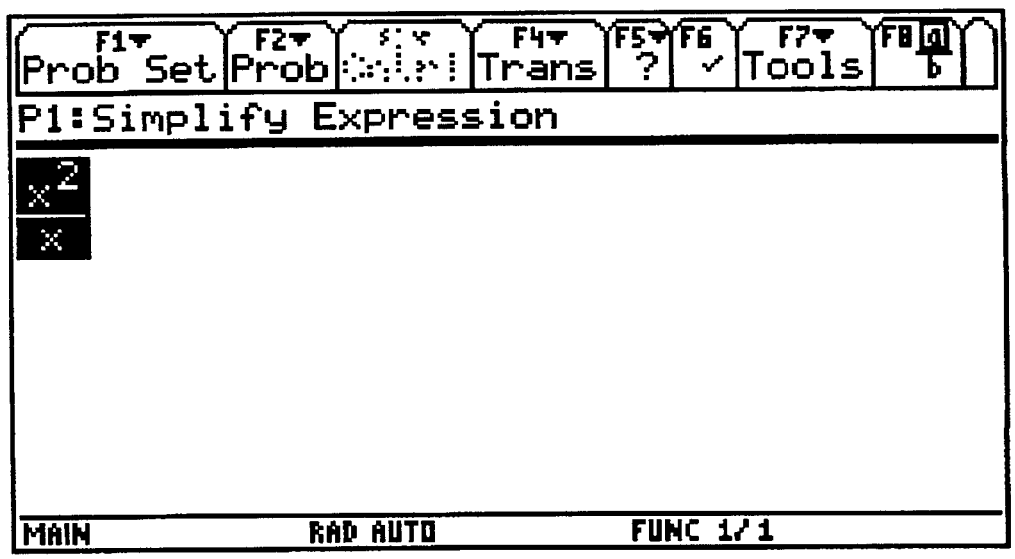
Figure 2E:
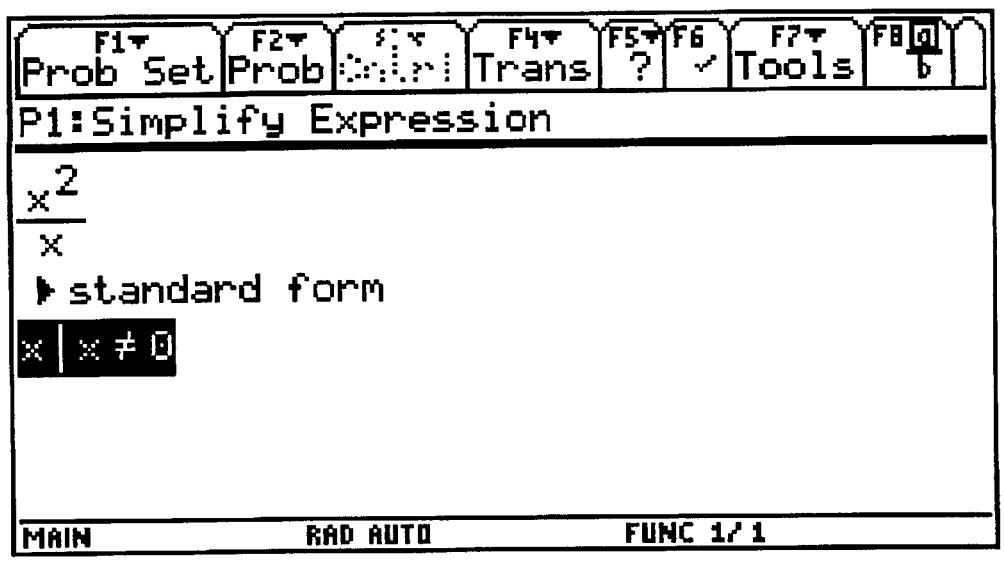
Figure 2F:
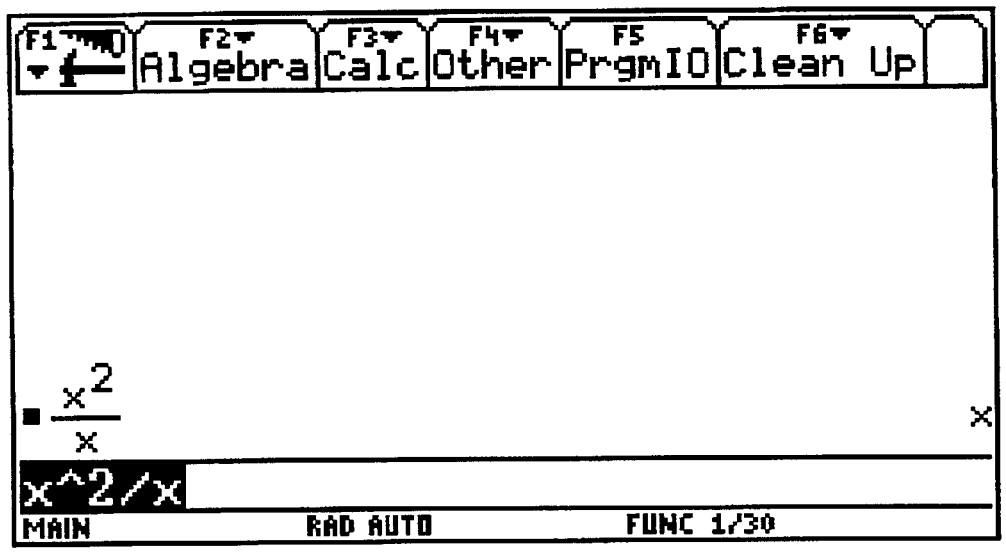

Preferred embodiments displaying only changes from apparent domains of definition during expression transformations avoids screen clutter. Further, preferred embodiments may also reduce unnecessary computations such as computing a domain of definition for every expression and sub-expression during a sequence of transformation steps. Preferred embodiment computer algebra systems could be used, for example, on calculators such as the Texas Instruments' TI-89 and TI-92 Plus which have symbolic modes of operation. Indeed, FIGS. 2a-2f illustrate a sequence of screens shots of a TI-89 calculator programmed with a preferred embodiment computer algebra system. In particular, FIG. 2a shows the screen with a prompt to the user to enter a new problem. FIG. 2b shows the next screen displaying a generic simplification of a fraction example ("$x^{k+1}/x$") in response to the user's new problem selection plus a line for user input. FIG. 2c shows the screen as in FIG. 2b but including the user's typed input of the expression "x^2/x". FIG. 2d shows the screen after entry (user striking "enter") of the user input which is now expressed as "$x^2/x$". FIG. 2e illustrates the screen after the preferred embodiment simplification (user again striking "enter") which has the "$x^2/x$" as FIG. 2d plus the comment "standard form" and the simplified expression "x|x≠0" that includes the domain preservation constraint "x≠0". Lastly, FIG. 2f shows a screen for a system without the domain preservation constraints; in particular, the user input "x^2/x" appears at the bottom, and in the next to the bottom line at the lefthand side the input recast as "$x^2/x$" and at the righthand side the simplified expression "x" without any indication of domain of definition.

Figure 3:
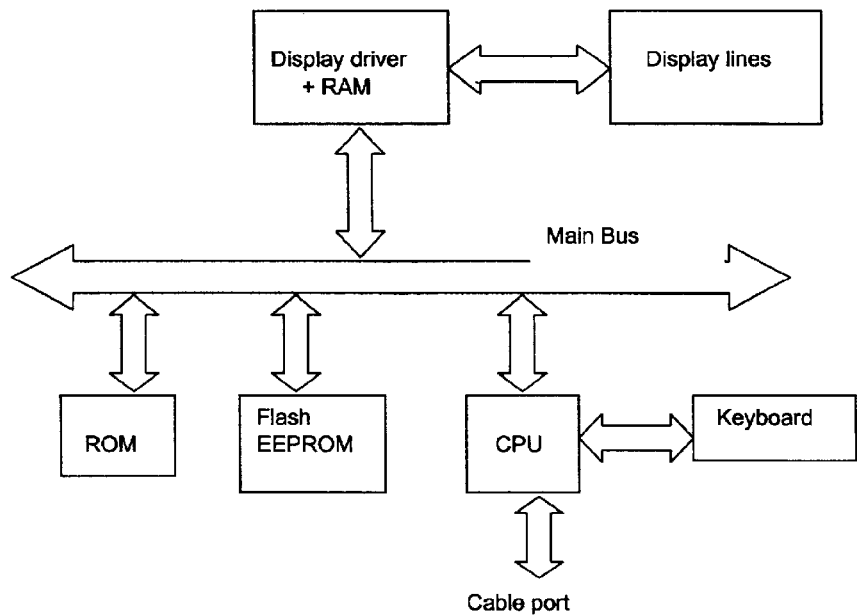
FIG. 3 shows functional blocks of a system.

FIG. 3 is a functional block diagram of a generic calculator which includes a cable port for programs and data which may be loaded into the flash EEPROM.

5. Alternative Preferred Embodiments

Rather than the rewrite rules of some preferred embodiments with only selective domain of definition computations, alternative preferred embodiments routinely compute dods for all expressions and compare dods to detect changes and consequent need for display as domain preservation constraints. Thus when a transformed expression has a larger dod than the original expression, the preferred embodiments apply the original expression's dod to the transformed expression and display it. Further preferred embodiments may limit the display to only the difference from the original's dod or to some other practical dod change.

For example, an original expression "$\sqrt{x}-\sqrt{(2-x)}+\sqrt{(2-x)}$" has a dod of $2 \geq x \geq 0$ and simplifies to $\sqrt{x}$ which has a dod of $x \geq 0$. Thus the preferred embodiments could transform to the expression "$\sqrt{x}|2 \geq x \geq 0$" or to "$\sqrt{x}|2 \geq x$" and in either case preserve the dod.

6. Modifications

The preferred embodiments can be modified in various ways while retaining the features of domain preservation constraints.

For example, the rewrite rules could be replaced by hard-wired code and continue avoidance of dod computations for all expressions.

What is claimed is:

1. A computer algebra system, comprising:

(a) a processor, input, and display;

(b) wherein a transformed algebraic expression is displayed with domain of definition constraint(s) only when said transformation changes domain of definition of said algebraic expression.

2. The system of claim 1, wherein:

(a) said transformation only computes a domain of definition when a possible domain of definition change exists.

3. The system of claim 2, wherein:

(a) said transformation incorporates at least one rewrite rule.

4. A method of display in a computer algebra system, comprising (a) displaying an algebraic expression; and (b) displaying a domain of definition for said algebraic expression when said algebraic expression is a transformation of a second algebraic expression and said transformation changes the domain of definition.

* * * * *